(12) United States Patent
Eslambolchi et al.

(10) Patent No.: US 7,882,209 B1
(45) Date of Patent: Feb. 1, 2011

(54) TIERED AND MODULAR APPROACH TO OPERATIONAL SUPPORT SYSTEMS

(75) Inventors: Hossein Eslambolchi, Los Altos Hills, CA (US); John McCanuel, Bailey, CO (US); Prakash Vasa, Clarksburg, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1308 days.

(21) Appl. No.: 11/239,832

(22) Filed: Sep. 30, 2005

(51) Int. Cl.
*G06F 15/173* (2006.01)
(52) U.S. Cl. .................. 709/223; 709/202; 709/220; 709/250; 370/256; 719/320; 719/328
(58) Field of Classification Search ............... 709/220, 709/223, 202, 250; 370/256; 719/320, 328
See application file for complete search history.

(56) References Cited

U.S. PATENT DOCUMENTS

| | | | |
|---|---|---|---|
| 6,343,086 B1 | 1/2002 | Katz et al. | |
| 6,453,356 B1 * | 9/2002 | Sheard et al. | 709/231 |
| 6,480,885 B1 * | 11/2002 | Olivier | 709/207 |
| 6,735,630 B1 * | 5/2004 | Gelvin et al. | 709/224 |
| 6,910,072 B2 * | 6/2005 | Macleod Beck et al. | 709/224 |
| 6,920,143 B1 | 7/2005 | Ortiz et al. | |
| 7,284,033 B2 * | 10/2007 | Jhanji | 709/206 |
| 7,401,131 B2 * | 7/2008 | Robertson et al. | 709/220 |
| 7,461,381 B2 * | 12/2008 | Adams et al. | 719/316 |
| 7,558,858 B1 * | 7/2009 | Eslambolchi et al. | 709/226 |
| 7,636,917 B2 * | 12/2009 | Darling et al. | 718/105 |
| 2001/0056362 A1 * | 12/2001 | Hanagan et al. | 705/7 |
| 2003/0217125 A1 * | 11/2003 | Brancati et al. | 709/220 |
| 2005/0078611 A1 * | 4/2005 | Adams et al. | 370/254 |
| 2005/0204083 A1 | 9/2005 | Chu | |
| 2005/0246726 A1 * | 11/2005 | Labrou et al. | 719/328 |
| 2007/0050446 A1 * | 3/2007 | Moore | 709/203 |

* cited by examiner

*Primary Examiner*—Michael Won
(74) *Attorney, Agent, or Firm*—Hoffmann & Baron, LLP

(57) ABSTRACT

A computer system and techniques are disclosed that provide support for the operations of a modern telecommunication services provider. The computer system includes several software modules arranged in layers that are configured to provide services, such as a data access, workflow, and business-management functions. In some preferred embodiments, data cleansing and enterprise-view functionality are provided. An application program interface is also provided that allows a software program to execute software modules contained in the layers to perform specific tasks.

23 Claims, 4 Drawing Sheets

TIERED AND MODULAR APPROACH TO OPERATIONAL SUPPORT SYSTEMS

TECHNICAL FIELD

The present invention generally relates to operational support systems, and more particularly to a tiered and modular approach to developing operational support systems.

BACKGROUND OF THE INVENTION

Generally, an operational support system ('OSS') refers to software that enables the support, administration, and management of a service providers' network. Typically, OSSes are used by telecommunication service providers and allow them to create, deploy, manage and maintain telecommunication services and resources. Over the years, service providers have created a multitude of OSS applications and systems for the various services being offered.

Given today's rapidly changing telecommunications environment, today's OSS systems are not well suited for change. Current OSSes tend to be difficult to modify, costly to maintain, and do not provide service providers with flexibility to extend new services and infrastructure easily. These factors have resulted in high operation and maintenance costs and delays in new service offerings and customer activation.

Customers using today's OSS systems also are at a disadvantage. For example, the majority of OSSes are not well integrated with other service provider systems and provide very little visibility into specific customer information. In addition, customer-facing systems, such as billing and customer care, are typically disconnected from the systems managing the service provider's network and services. As a result, customer loyalty and revenue are being impacted.

Hence, there is a need for OSS systems to be seamlessly integrated with other service provider systems. There is also a need for OSSes to be built upon a common set of interfaces and standards to support a multitude of new and emerging technologies. For example, technologies such as the Internet Protocol ('IP'), Asynchronous Transfer Mode ('ATM'), frame relay and digital subscriber line ('DSL') are becoming increasingly prevalent in network technologies. In addition, service providers have an increased need for feature-rich services that can manage an ever-increasing number of network resources and protocols while enhancing a customer's quality of service.

SUMMARY OF THE INVENTION

A computer system and techniques are disclosed that provide support for the operations of a modern telecommunication services provider. The computer system includes several software modules arranged in layers that are configured to provide services, such as a data access, workflow, and business-management functions. In some preferred embodiments, data cleansing and enterprise-view functionality are provided. An application program interface is also provided that allows a software program to execute the software modules contained in the layers to perform specific tasks.

For example, according to one aspect, the system includes data access modules wherein each of the data access modules include program instructions that, when executed, interact with a data source. Each of the data access modules is also callable from an application programming interface that identifies a function of the data access module and the data source. The system also includes workflow modules wherein each of the workflow modules include program instructions that, when executed, automate provisioning activities of an enterprise. Each of the workflow modules is also callable from the application programming interface which identifies a function of the workflow module. The system also includes business control modules wherein each of the business control modules include program instructions that, when executed, provide a business control function. Each of the business control modules is callable from the application programming interface and identifies a function of the business control module.

In some preferred embodiments, the system also may include data cleansing modules that identify a discord from among a plurality of data sources and also may include enterprise-view modules that provide a single view of information stored in a plurality of data sources. Each of the enterprise view modules and data cleansing modules are callable from the application programming interface, which identifies a function of the enterprise view module and data cleansing module, respectively.

A system, as well as articles that include a machine-readable medium storing machine-readable instructions for implementing the various techniques, are disclosed. Details of various embodiments are discussed in greater detail below.

In some embodiments, one or more of the following advantages may be present. For example, the disclosed techniques may allow a service provider to easily integrate new services and modify existing services due to the modular and layered implementation disclosed.

A further benefit relates to customer service levels. For example, a customer using the disclosed techniques may be given greater visibility into customer specific information without having to access multiple service provider system for the same information.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
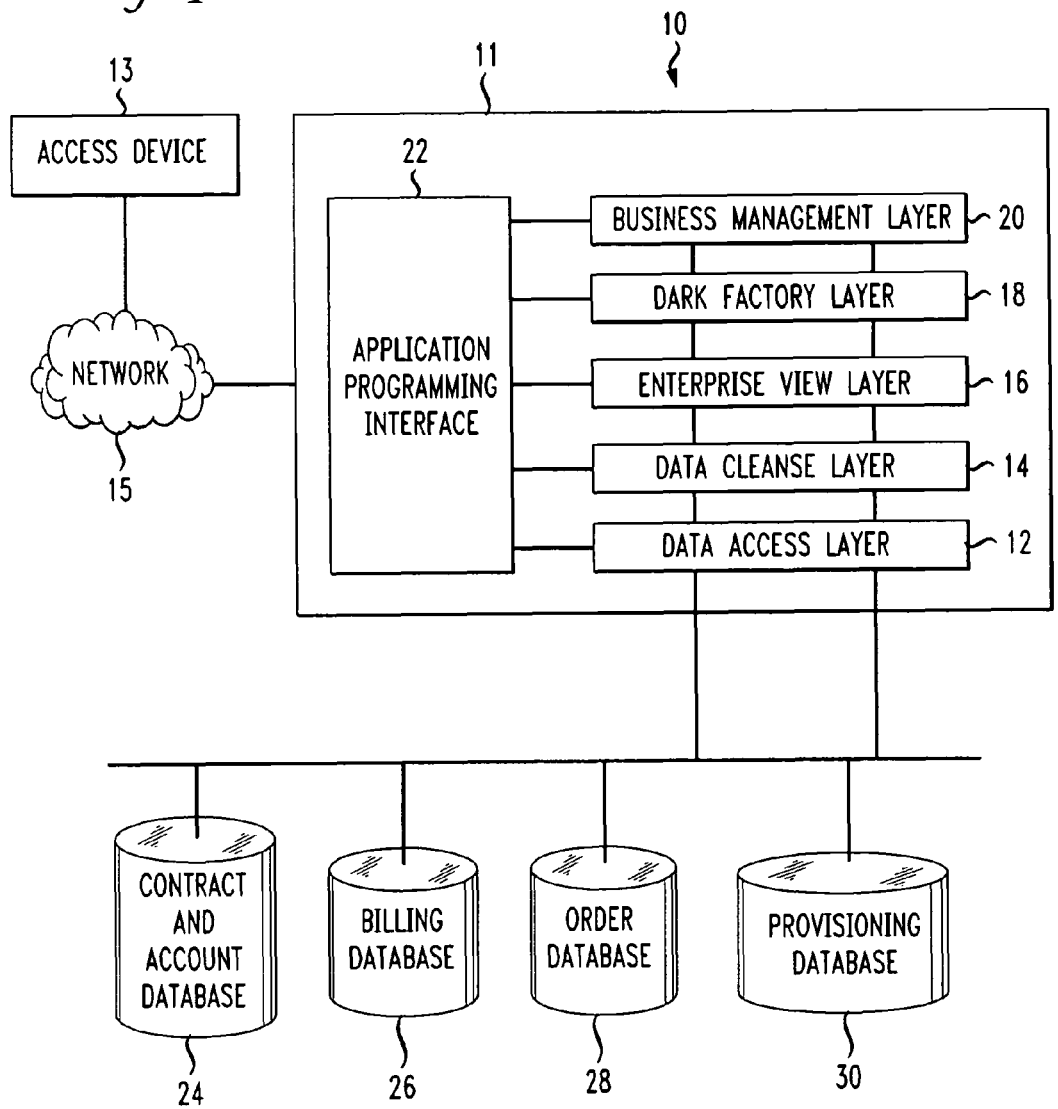
FIG. 1 is a block diagram of an operational support system in accordance with the present invention.

Referring to FIG. 1, a computer-based operational support system 10 is disclosed. The system 10 includes a server 11 that is configured to include a set of layered software modules that may be used as building blocks for constructing software programs. As shown in FIG. 1, a user using an access device 13 over a network 15 may access the server 11 to execute software module functionality.

The layered software modules provide integrated access to unified views of, for instance, customer ordering, billing, and service provisioning systems and an ability to monitor, control, analyze, deploy, and maintain a communications network. In a preferred embodiment, the set of layered software modules are arranged hierarchically and may execute software modules arranged in a layer below it and provide interfaces to functionality to a layer above it.

For example, as shown in FIG. 1, layered software modules may be arranged hierarchically and include a 'data-access layer' 12, a 'data-cleanse layer' 14, an 'enterprise-view layer' 16, a 'dark-factory layer' 18 and a 'business-control layer' 20. Each software module included in a layer may execute functionality included in a lower software layer and provide software functionality to modules in a higher software layer. Thus, a level of functional and data abstraction and transparency may be achieved since higher level software modules need not be aware of lower level software module implementations.

An application programming interface 'API' 22 is provided that includes a set of interfaces that allow a software application to execute functionality stored in any of the layered software modules. The interface consists of sets of function definitions, procedures, variables and data structures that an application program may use to execute functionality in a layer as opposed to executing custom software code written to perform the same task. Thus, the API 22 provides an additional level of abstration between lower-level and higher-level software modules.

In a preferred embodiment, as shown in FIG. 1, various types of enterprise level information may be accessible to the system 10. For example, in one embodiment shown in FIG. 1, a contract database 24 is accessible that includes service level information needed to properly service a customer. A service provider's billing database 26 is accessible that includes customer account receivable and/or payable information. In addition, an ordering database 28 is accessible that maintains information regarding the type of service ordered. An inventory database 29 also is accessible that provides information as to whether proper network equipment is installed or whether new equipment needs to be installed for a particular customer and service and a provisioning database 30 is accessible that provides information to automatically activate services for customers. Although the FIG. 1 example illustrates four separate databases accessible to the system 10, the system 10 is not limited to accessing these four databases and may access any number of service provider or third party databases.

Figure 2:
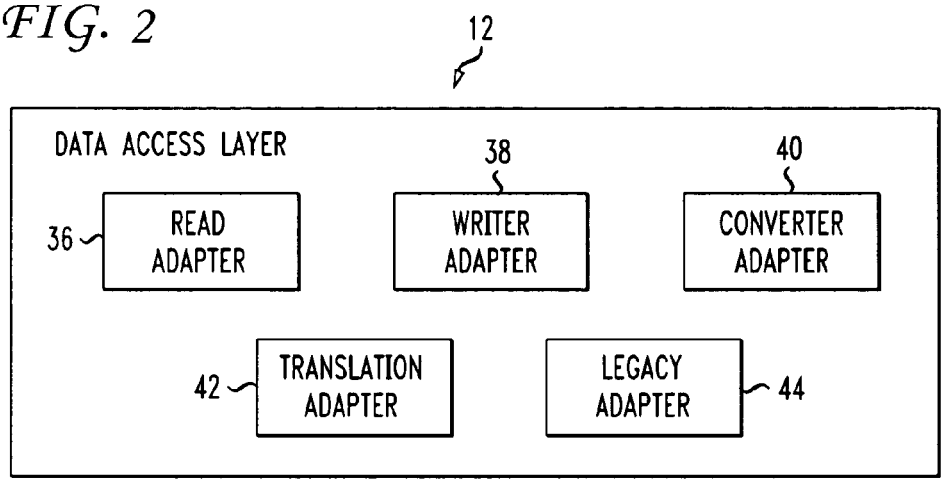
FIG. 2 is a block diagram of the data-access layer shown in FIG. 1.

Referring now to FIG. 2, the data-access layer 12 preferably provides software modules (e.g., data interfaces and drivers) that allow software applications using the API 22 to retrieve and store data from heterogeneous data stores and software modules that standardize and assemble data needed for the enterprise. In one embodiment, for example, the data-access layer 12 is configured as the bottom layer of the system 10 and converts data from databases and API requests from software applications into the native language of data without requiring the development of custom software code. In addition, the software modules included in the data-access layer 12 utilize ODBC—Open DataBase Connectivity, OLE DB—Object Linking and Embedding Database, JDBC™— Java Database Connectivity, JCA—java Connectivity Adapters, Web services, and similar technologies. The data-access layer 12 also includes software modules that standardize and assemble data needed for the enterprise.

As shown in FIG. 2, a read-adapter 36 is provided as part of the data-access layer 12 and reads data from functional data stores such as relational databases, ERMs, as well as mainframes accessible to the system 10. For example, the read-adaptor 26 may be configured to read data from the ordering system 28 shown in FIG. 1. Similarly, the read-adaptor 36 may be configured to read data from a ticketing system and billing system since both ticketing and billing are functions of an enterprise.

A write-adapter 38 is provided as part of the data-access layer 12 and stores data into functional data stores such as relational databases, CRMs—Customer Relationship Management systems, as well as mainframes. It will be appreciated by one skilled in the art that although only one read-adapter 36 and write-adapter 38 are shown in FIG. 2, the data-access layer 12 may include more than one read-adapter and write-adaptor to read and write functional data stores, respectively, from legacy and heterogeneous computing environments.

A converter adapter 40 is provided as part of the data-access layer 12 and removes anomalies and duplicates that may exist in enterprise data. In one embodiment, the converter adapter 40 may provide a consistent standard way of dealing with single data elements. For example, when the information is accessed from multiple functional data stores, there may be a requirement to view this information in a consistent manner across the enterprise.

A translation adaptor 42 is provided as part of the data access layer 12 and provides data consistency between various functional data stores. For example, two functional data stores may contain information relating to a particular circuit identifier, each storing the circuit identifier in a different format (e.g., alphanumeric, numeric) on different legacy systems. The converter-adapter 40 using the read-adapter 36 may access the circuit identifier from these two functional data stores and provide a consistent image of the data to the enterprise. Once the circuit identifier information is analyzed by the enterprise, the translation adaptor 42 transforms the consistent image of the data back to each respective legacy systems data format. The translation adaptor 42 then may use the write-adapter 38 to store the circuit identifier and any related information back to each respective legacy system.

Figure 3:
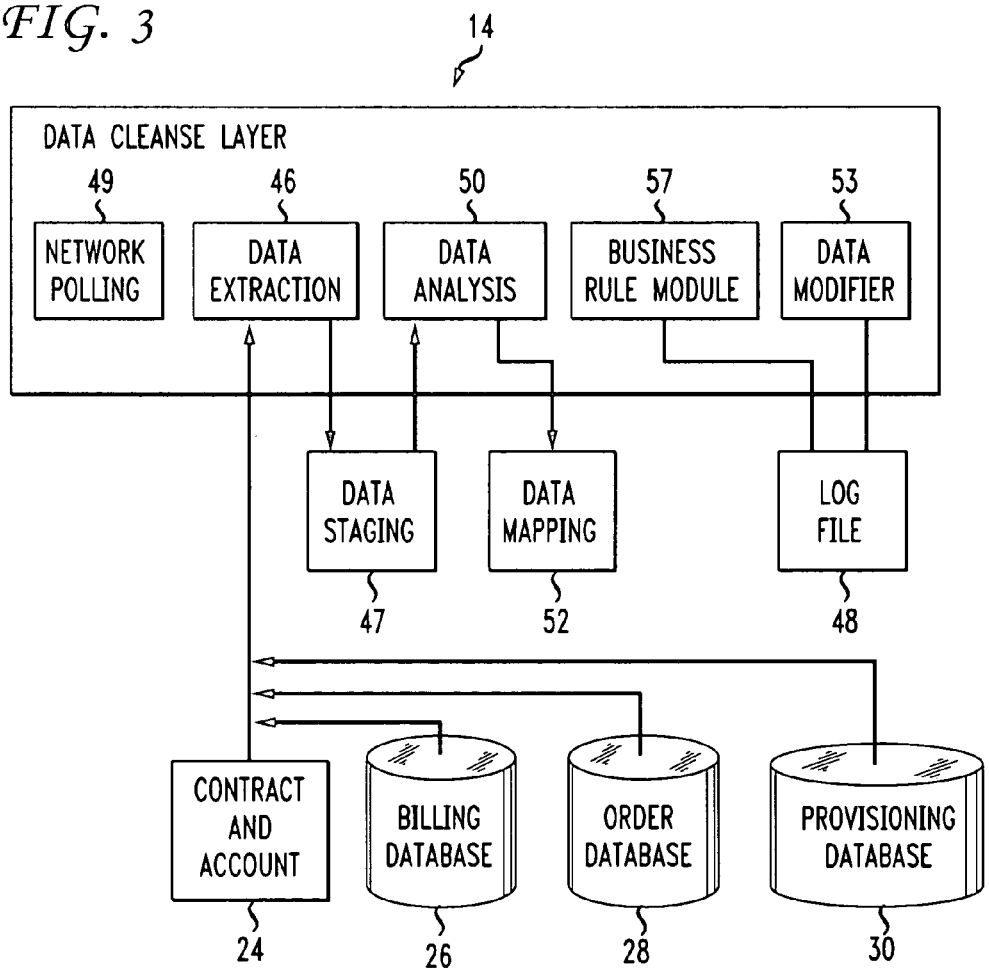
FIG. 3 is a block diagram of the data-cleanse layer shown in FIG. 1.

Referring now to FIG. 3, the data-cleanse layer 14 provides software modules that allow a service provider to determine discords among enterprise databases. A discord is defined as a discrepancy or difference between data extracted from individual enterprise databases and data extracted from a most-trusted data source or industry-standard database that is to be corrected.

As shown in FIG. 3, a data-extraction module 46 is provided that may extract data from a plurality of enterprise databases 24, 26, 28 and 30. The data-extraction module 46 employs well known techniques in the art, such as file dumps, Open Database Connectivity (ODBC), and the like to extract data from databases. In a preferred embodiment, the data-extraction module 46 extracts data on an atomic level from enterprise databases 24, 26, 28 and 30 and temporarily stores the same in an extracted data-staging database 47. The word "atomic" is used herein to refer to indivisible and/or irreducible data.

A network-access-polling module 49 is provided that selects a most-trusted database from among the several databases accessible to the system 10. For example, as shown in FIG. 3, the contract and accounting database 24 may be selected as the most-trusted database for specific types of atomic information. The selected most-trusted database is used by a business-rules module 51 to compare atomic data.

A data-analysis module 50 is provided that analyzes information stored in the extracted data-staging database 47. In a preferred embodiment, the data-analysis module 50 generates cross-reference tables and mapping tables that are stored in a data-mapping database 52. The data-analysis module 50 preferably utilizes relation-building functions, such as that disclosed in U.S. Patent Publication No. 2005/0027717, filed Apr. 21, 2004, which is incorporated herein by reference in its entirety. The data-analysis module 50 may be adapted to operate on any dimension of data and/or format of database, such as flat files, relational files, hierarchical files, network files, and the like. In some embodiments, the data-analysis module 50 preferably may flatten the extracted data into two (2) dimensions, if required.

The business-rules module 57 includes a set of rules for determining discords between data extracted from enterprise databases and the most-trusted database. As shown in FIG. 3, the business-rule module 57 uses the cross-reference and mapping tables stored in the data-mapping database 52 by the data-analysis module 50 to identify discords between enterprise data and the most-trusted database using the business rules. For example, the business-rule module 51 may include a business rule that specifies that all U.S. addresses stored in enterprise databases are to have a 5+4 zip code length. Zip-code information in databases not containing the 5+4 zip code length are identified as discords. In some embodiments, as shown in FIG. 3, the business-rules module 51 generates a log file 48 that may store the discords for further analysis.

A data-modifier module 53 is provided that modifies data extracted from enterprise databases based on identified discords. For example, using the previous example, the data-modifier module 53 may modify atomic data such as the U.S. zip code with an appropriate 5+4 zip code length. Once the atomic data is modified, the data-modifier module 53 executes the write-adapter module 38 of the data-access layer 12 to store the modified data back into its source database automatically.

Figure 4:
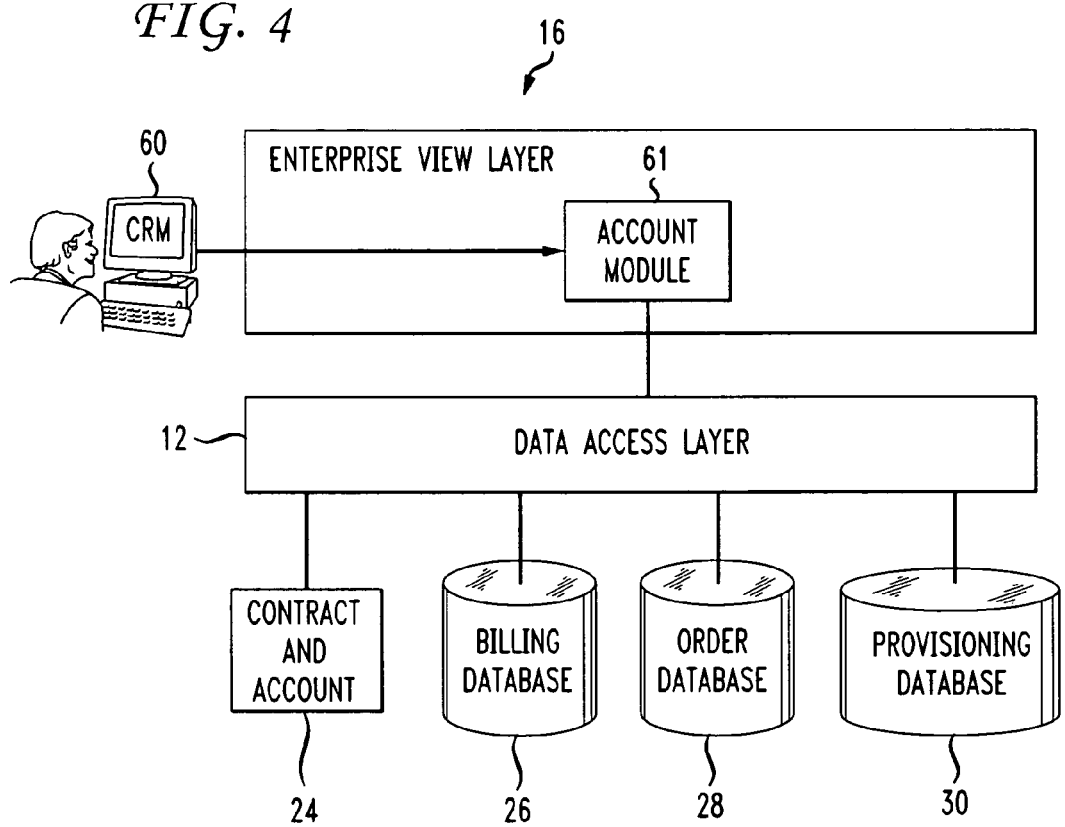
FIG. 4 is a block diagram of the enterprise-view layer shown in FIG. 1.

Referring now to FIG. 4, the enterprise-view layer 16 of the system is disclosed. The enterprise-view layer 16 includes software modules that provide views of functional data stores as a single domain. Each software module in the layer 16 may define a specific functional domain of interest. In a preferred embodiment, the software modules create sessions for each user request and employ very high speed digital subscriber line 'VDSL' technology to process requests. Although only one software module is shown in FIG. 4, it will be appreciated by one skilled in the art that a plurality of modules may be included in the enterprise-view layer 16 to view different functional data as a single domain.

For example, as shown in FIG. 4, a user accessing a Customer Relationship Management 'CRM' system 60 may request contract and provisioning information, respectively, from the contract database 24 and the provisioning database 30 relating to a customer account using the API 22 by providing an account-identifier to an account module 61. The account module 61 generates a session for the request and connects to enterprise databases using software modules of the data-access layer 12. Once the data-access layer 12 modules access the data, and there are no discords, if data-cleansing modules are executed, the account information from each of the databases 24, 30 is provided to the account module 61, which in turn amalgamates the information into a single view and provides the same to the requestor.

If a request for customer account information includes a list of customer accounts instead of a single customer account identifier and a corresponding list of information relating to those customer accounts is requested, the same account module 61 is executed. In this scenario, the account module 61 generates a new session for this request and connects to the databases using the data-access layer 12. The new session generated for the request includes instructions to wait until all data is received from the various databases. Once all of the information is received, the account module 61 amalgamates the information and provides the same to the requestor.

Figure 5:
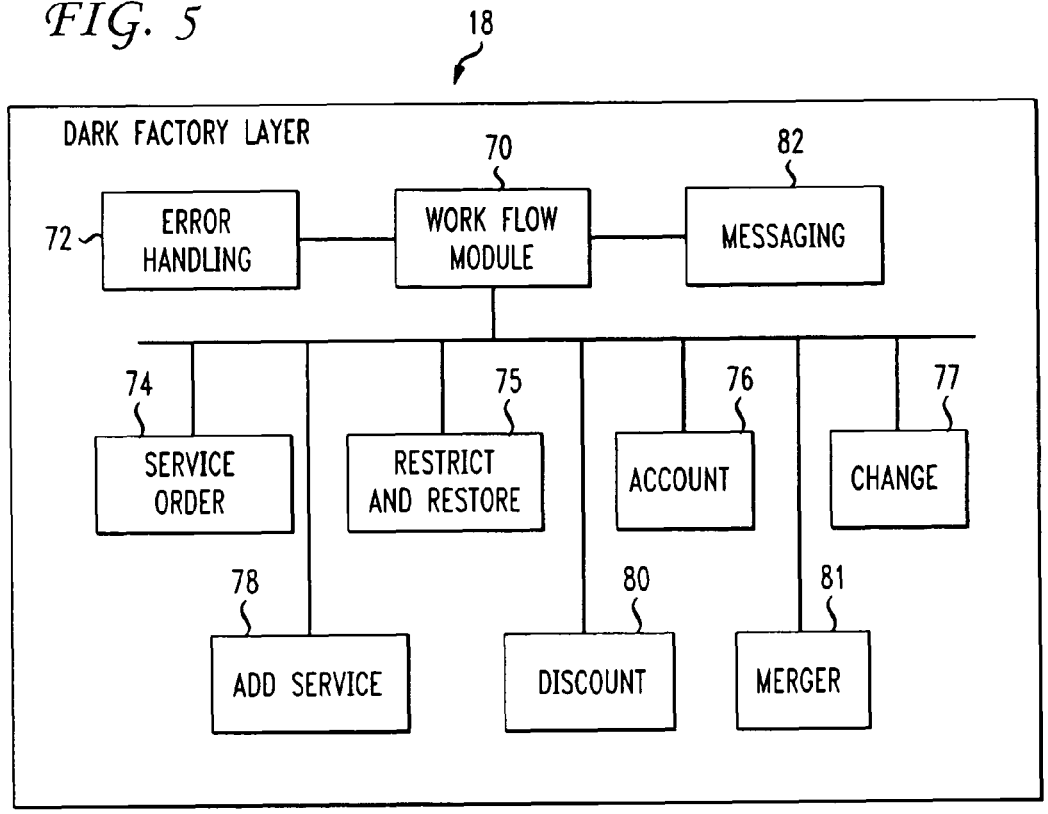
FIG. 5 is a block diagram of the dark-factory layer shown in FIG. 1.

Referring now to FIG. 5, the dark-factory layer 18 of the system 10 is disclosed. The dark-factory layer 18 includes a set of software modules that automate provisioning activities of the enterprise and provide communication between various enterprise systems. In addition, software modules included in the dark-factory layer 18 include error handling and messaging functionality to control the distribution and status of provisioning activities as they are completed. In one embodiment, as shown in FIG. 5, the dark-factory layer 18 includes a workflow module 70, an error-handling module 72, a messaging module 82 and a set of workflow-templates that include a service-order template 74, a restrict-restore template 75, an account template 76, a change template 77, an add-service template 78, a discount template 80 and a merger template 81.

Workflow-templates are provided that identify the set of data and tasks needed to accomplish an enterprise activity. In a preferred embodiment, to order a service, a service order is created using a service-order template. The service-order template is generic and may be used for any type of order. For example, a service order requiring a T1 line, whether needed for a frame service, an IP service or ATM service uses the same service-order template 74. For services that require specific information, for example Voice Over IP, the service-order template 74 may include generic and specific information relating to that type of service.

Other templates included in the system include the disconnect template 80 that identifies tasks and data needed to totally or partial disconnect a customer from a particular service, the add-service template 78 that identifies tasks and data needed to add additional services to an existing customer contract and to enhance services to customers, the account template 76 that identifies tasks and data needed to add a total new service for a new customer and/or add a new service for a previous customer and the change-template 77 that identifies tasks and data needed to enhance a current service configuration.

Several preferred embodiments of the invention also include the restrict-restore template 75 that identifies tasks and data to restrict services or restore services to bad debt customers and thereby has an added advantage of reducing contra-revenue to the enterprise. The merger template 81 also is provided that identifies tasks and data needed to process customer mergers and acquisitions. For example, in one embodiment, the merger template 81 may include tasks and data necessary to automatically merge customer account and inventory information effected by a corporate merger upon request.

The workflow module 70 defines, manages and executes workflow processes through the execution of software whose order of execution is driven by a computer representation of the tasks contained in templates. The workflow module 70 controls the flow of work (sequences of management activities which form a management business process) by determining the scheduling of required events. The workflow module 70 is responsible for business process creation, deletion, and management of process execution from instantiation through completion and control of the activity of scheduling within the system. In a preferred embodiment, the workflow module 70 accepts requests from the API 22 and, based on information contained in the templates, executes program instructions that invoke a sequence of activities that pass application specific information to other systems for execution.

An error-handling module 72 is provided that processes errors that may occur while executing tasks defined in the templates. In the event execution of tasks included in a template fails, the error-handling module 72 provides a standard way of processing such errors. For example, assume a private line service order and a frame relay service order is created in the system. In the event that either order is missing information, such as customer contact information, the error handling module 72 provides a standard error messaging format and unique code for that missing information that may be used to inform users of the missing information. The standard error message format and codes may be used across the enterprise irrespective of type of user or service.

A messaging module 82 is provided that passes messages between service provider systems. In one embodiment, the messaging module uses Web Services Definition Language (WSDL) and encapsulates system specific messages for processing using SOAP over HTTP. For example, assuming a service order having ten components that is distributed across multiple provisioning modules, as each provisioning completes its provisioning process, the messaging module 82 aggregates each provisioning modules confirmations and provisioning detail information for an assembly.

Figure 6:
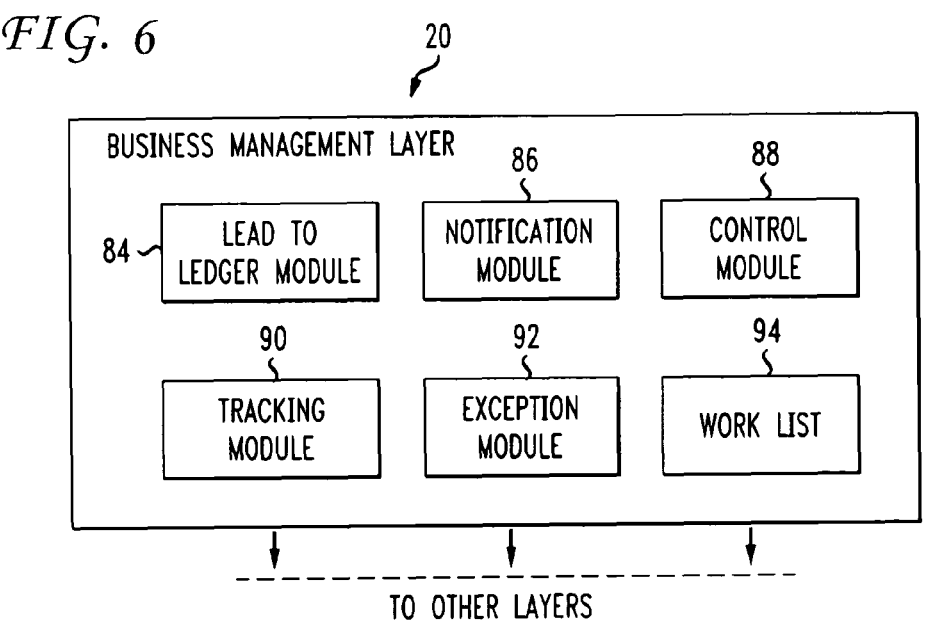
FIG. 6 is a block diagram of the business-management layer shown in FIG. 1.

Referring now to FIG. 6, the business-management layer 20 of the system is disclosed. The business-management layer 20 includes software modules that provide business control for the services generated by the system. This layer 20 also provides interfaces to external applications and databases that are accessible via the application programming interface 22.

A work-list module 94 is provided that identifies tasks that may need manual intervention. For example, as discussed previously, templates are provided in the dark-factory layer 18 that identify tasks that are to be completed to perform an enterprise activity. If during execution of a task, a problem occurs that is not automatically corrected, the error is sent to the work-list module 94, which in turn displays the task on a display device for manual intervention.

A notification module 86 is provided that identifies data items of interest. For example, when a status message is sent from one system to another, these messages may server as confirmation messages of tasks being initiated or completed. For example, assuming a service order having ten components, as work components are distributed to provisioning modules, the notification module receives message from the provisioning modules indicating that the order is received successfully and is being processed. One advantage of providing this module may be to review how an order processed from its initial state to actual network provisioning.

A tracking module 90 is provided that allows an end-user to track the status of orders and tasks as they progress through the system. Several advantages may derive from this module. A customer may using the tracking module 90 is able to determine exactly where their order may be in the system. For example, a customer using the tracking module 90 may be able to tell that a particular order is stalled in a data center area of the enterprise.

An exception module 92 is included that provides an enterprise-wide standard for transaction error handling. For example, if a provisioning module is unable to complete a provisioning task for a particular reason, the exception module 92 provides a standard way for identifying and reporting the provisioning failures across all provisioning modules. One advantage of this module may be that fewer people need to understand the intricacies of a process and can focus on the actual event.

A lead-to-ledger module 84 provides a single enterprise process for lead tracking through accounting. For example, in one embodiment, the lead-to-ledger module tracks selling to the customer, executing a contract, taking a service order, provisioning the service order, billing and accounting of sales to the ledger. One advantage of providing the lead-to-ledger module 84 may be that from the time the lead occurs, the service provider can track that lead directly to their accounting books.

A control module 88 is provided that identifies when business data is not conforming to service provider controls. For example, one control may be that the ordering system never issue an order without first checking whether the customer has executed a valid service provider contract. In the event an order is issued without a valid contract, the control module identifies that order and displays the same on a display device for additional analysis.

Various features of the system may be implemented in hardware, software, or a combination of hardware and software. For example, some features of the system may be implemented in one or more computer programs executing on programmable computers. In addition, each such computer program may be stored on a storage medium such as read-only-memory (ROM) readable by a general or special purpose programmable computer or processor, for configuring and operating the computer to perform the functions described above.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An operational support system comprising:
an application programming interface; and
a plurality of software modules organized in hierarchical layers, the modules including program instructions that, when executed, invoke a module configured in an adjacent lower layer of the plurality of hierarchical layers and provide functionality to a module in an adjacent upper layer of the plurality of hierarchical layers, the modules being callable from the application programming interface, wherein the plurality of modules include a data access module, a data cleansing module and a workflow module, the data access module including program instructions that, when executed, retrieves and standardizes data from a plurality of data sources, wherein the data access module removes duplicates received from the data sources, the data cleansing module including program instructions that, when executed, provide information to identify a discord from among the plurality of data sources, the workflow module including program instructions that, when executed, automate provisioning activities of an enterprise and provide exception handling during execution of the provisioning activity, wherein the data access module, the data cleansing module and the workflow module are each callable from the application programming interface, the application programming interface identifying functions of the data access module, the data cleansing module, the workflow module and the plurality of data sources.

2. The system of claim 1 wherein the data access module including program instructions that, when executed, interact with a data source.

3. The system of claim 1 wherein the data cleansing module is configured to include program instructions that, when executed, access a business rule to determine the discord.

4. The system of claim 1 wherein the data cleansing module is configured to include program instructions that, when executed, identify a most-trusted data source from the plurality of data sources to determine the discord.

5. The system of claim 1 wherein the plurality of modules include an enterprise-view module, the enterprise view module including program instructions that, when executed, provide a single view of information stored in a plurality of data sources, the enterprise-view module being callable from the application programming interface, the application programming interface identifying a function of the enterprise view module.

6. The system of claim 1 wherein the workflow module is configured to include program instructions that, when executed, access at least one workflow template, the workflow template identifying tasks and data needed to perform the provisioning activity.

7. The system of claim 6 wherein the workflow module is configured to include program instructions that, when executed, determine the scheduling of tasks identified in the at least one workflow template.

8. The system of claim 1 wherein the workflow module is configured to include program instructions that, when executed, provide message handling during execution of the provisioning activity.

9. The system of claim 1 wherein the plurality of modules include a business control module, the business control module including program instructions that, when executed, provide a business control function, the business control module being callable from the application programming interface, the application programming interface identifying a function of the business control module.

10. The system of claim 9 wherein the business control module is configured to include program instructions that, when executed, monitor an enterprise activity.

11. The system of claim 9 wherein the business control module is configured to include program instructions that, when executed, provide a consolidated enterprise-wide control point.

12. The system of claim 1 wherein the data access module includes a read-adapter reading data from a relational database and a write-adapter storing the relational database data in another relational database.

13. The system of claim 1 wherein the data access module includes a converter-adapter standardizing data format before the duplicates received from the data sources are removed.

14. The system of claim 1 wherein the data access module is organized in a lower layer than the data cleansing module.

15. The system of claim 14 wherein the converter-adapter translates the data to an enterprise consistent image.

16. The system of claim 1 wherein the data cleansing module includes sub-modules, wherein at least one of the sub-modules is a network-access-polling module, the network-access-polling module including program instructions that, when executed, selects a most-trusted data source from among the data sources.

17. The system of claim 1 wherein the data cleansing module includes sub-modules, wherein at least one of the sub-modules is a data-modifier module, the network-access-polling module including program instructions that, when executed, modifies extracted data based on the identified discord.

18. The system of claim 1 wherein the plurality of modules include a work-list module, the work-list module including program instructions that, when executed, identifies tasks needing manual intervention.

19. The system of claim 1 wherein the plurality of modules include a lead-to-ledger module, the lead-to-ledger module including program instructions that, when executed, tracks sales to a customer, execution of a contract, taking of a service order, provisioning of the service order, billing and accounting of the sales to a ledger.

20. A method of arranging an operational support system comprising:

providing an application programming interface; and organizing a plurality of software modules in hierarchical layers, the modules invoking a module configured in an adjacent lower layer of the plurality of hierarchical layers and providing functionality to a module in an adjacent upper layer of the plurality of hierarchical layers, the modules being callable from the application programming interface, wherein organizing the plurality of software modules includes providing a data access module, a data cleansing module a workflow module and a business control module, the data access module retrieving and standardizing data from a plurality of data sources and the data access module removing duplicates received from the data sources, the data cleansing module providing information to identify a discord from among the plurality of data sources, the workflow module including program instructions that, when executed, automate provisioning activities of an enterprise and provide exception handling during execution of the provisioning activity, the business control module including program instructions that, when executed, monitor an enterprise activity, the data access module, the data cleansing module, the workflow module and the business control module each being callable from the application programming interface, the application programming interface identifying functions of the data access module, the data cleansing module, the workflow module, the business control module and the plurality of data sources.

21. The method of claim 20 wherein organizing the plurality of software modules includes providing an enterprise-view module, the enterprise view module providing a single view of information stored in a plurality of data sources, the enterprise-view module being callable from the application programming interface, the application programming interface identifying a function of the enterprise view module.

22. The method of claim 20 wherein organizing the plurality of software modules includes providing a work flow module, the work flow module automating provisioning activities of an enterprise, the workflow module being callable from the application programming interface, the application programming interface identifying a function of the workflow module.

23. The method of claim 20 wherein the business control module provides a business control function.

* * * * *